(12) United States Patent
Hara

(10) Patent No.: US 9,069,366 B2
(45) Date of Patent: Jun. 30, 2015

(54) SWITCHING REGULATOR

(71) Applicant: Kiyohito Hara, Hyogo (JP)

(72) Inventor: Kiyohito Hara, Hyogo (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 127 days.

(21) Appl. No.: 13/773,994

(22) Filed: Feb. 22, 2013

(65) Prior Publication Data

US 2013/0241507 A1    Sep. 19, 2013

(30) Foreign Application Priority Data

Mar. 19, 2012   (JP) ................. 2012-061808

(51) Int. Cl.
   *G05F 1/00*   (2006.01)
   *G05F 1/10*   (2006.01)

(52) U.S. Cl.
   CPC ........................ *G05F 1/10* (2013.01)

(58) Field of Classification Search
   CPC ..... H02M 3/155; H02M 3/156; H02M 3/158; H02M 3/1588; H02M 3/1584; H02M 3/1563; H02M 3/33507
   USPC .......................... 323/282, 284–288
   See application file for complete search history.

(56) References Cited

U.S. PATENT DOCUMENTS

| | | | |
|---|---|---|---|
| 7,868,602 B2 | 1/2011 | Omi et al. | |
| 8,159,800 B2 | 4/2012 | Hara | |
| 2008/0024099 A1* | 1/2008 | Oki et al. | 323/282 |
| 2009/0174385 A1* | 7/2009 | Yen et al. | 323/288 |
| 2009/0284237 A1* | 11/2009 | Kitagawa et al. | 323/282 |
| 2009/0316311 A1 | 12/2009 | Hara et al. | |
| 2011/0133711 A1* | 6/2011 | Murakami et al. | 323/282 |
| 2011/0279045 A1* | 11/2011 | Uchimoto et al. | 315/186 |
| 2012/0049828 A1 | 3/2012 | Hara et al. | |
| 2012/0049829 A1* | 3/2012 | Murakami | 323/288 |

FOREIGN PATENT DOCUMENTS

| | | |
|---|---|---|
| JP | H07-336999 | 12/1995 |
| JP | 2006-141184 | 6/2006 |
| JP | 2007-185065 | 7/2007 |
| JP | 2007-185066 | 7/2007 |
| JP | 2010-011529 | 1/2010 |

* cited by examiner

*Primary Examiner* — Gary L Laxton
*Assistant Examiner* — Kevin H Sprenger
(74) *Attorney, Agent, or Firm* — Cooper & Dunham LLP

(57) ABSTRACT

A switching regulator includes a switching element to generate an output voltage, a reference voltage source to generate a reference voltage, a soft-start circuit to set the reference voltage increasing gradually within a range, an error amplifier circuit to generate an error difference voltage indicating an error difference between the reference voltage and feedback voltage of the output voltage of the switching regulator, a switching circuit to generate a switching signal to control the switching element in response to the error difference voltage, and a current limiting circuit to generate a limiting signal indicating a comparison result between an current into the switching element and a limit being set to increase within a range, wherein the switching circuit controls a duty cycle of the switching signal so that the current through the switching element does not exceed the limit in response to the limiting signal.

7 Claims, 10 Drawing Sheets

SWITCHING REGULATOR

BACKGROUND OF THE INVENTION

1. Field of the Invention

The disclosures herein generally relate to a step-up switching regulator controlling output voltage with a PWM signal, especially, a switching regulator which prevents inrush current from being generated while starting the output voltage.

2. Description of the Related Art

Conventional switching regulators are described, for example, in patent documents 1-5.

FIG. 7 is a block diagram illustrating a configuration of a switching regulator taken as a first example of conventional art. The switching regulator shown in FIG. 7 is a step-up switching regulator adjusting brightness of white LEDs (WLEDs) in response to a PWM signal input as an enable signal EN. FIG. 8 is a timing chart explaining behavior of the switching regulator shown in FIG. 7.

The switching regulator shown in FIG. 7 generates an output voltage Vout from power supply voltage Vcc, which is applied to n white LEDs (WLED1-WLEDn), which are all the same type and connected in series. An inductor L1 and a switching transistor MN1 are connected in series between the power supply voltage Vcc and ground potential GND, to which input current Iin is supplied from the power supply voltage Vcc. A node between the inductor L1 and the switching transistor MN1 is connected to a capacitor C1 and WLED1-WLEDn via a rectifier D1. WLED1-WLEDn are connected to ground via a resistor R1. A reference voltage circuit 1 generates a reference voltage Vref, which is sent to a PWM signal converting circuit 2. The PWM signal converting circuit 2 receives as input the PWM signal as the enable signal EN, changes the reference voltage Vref in response to a duty cycle of the enable signal EN (the PWM signal), which is sent as input to a non-inverted input terminal of an error amplifier circuit 3. An inverted input terminal of the error amplifier circuit 3 receives as input a feedback voltage Vfb generated between WLED1-WLEDn and the resistor R1. The error amplifier circuit 3 generates an error difference voltage Verr indicating an error difference between the reference voltage Vref and the feedback voltage Vfb, which is sent to a switching control circuit 4. The switching control circuit 4 further receives as input a slope voltage Vslp and a clock signal CLK generated by an oscillator 6, and a limiting signal Vlim corresponding to a predetermined current limit value Isw generated by a current limiting circuit 7. The switching control circuit 4 generates a switching signal PWMOUT based on the error difference voltage Verr, the slope voltage Vslp, the clock signal CLK, and the limiting signal Vlim. Specifically, the switching control circuit 4 compares the error difference voltage Verr and the slope voltage Vslp to generate the switching signal PWMOUT, which controls the duty cycle of the switching transistor MN1 to make the feedback voltage Vfb become equal to the reference voltage Vref (PWM control). The switching control circuit 4 applies the switching signal PWMOUT to the gate of the switching transistor MN1 via an output buffer circuit 5.

In the switching regulator shown in FIG. 7, the output voltage Vout is the sum of the feedback voltage Vfb and forward direction voltage of a white LED multiplied by n, where n is the number of LEDs, WLED1-WLEDn, connected in series. A current flowing through WLED1-WLEDn, Iwled, is given by Iwled=Vfb/R1. Since the reference voltage Vref varies in response to the duty cycle of the enable signal EN (PWM signal), it is possible to change arbitrarily the value of the feedback voltage Vfb with the duty cycle of the enable signal EN, which in turn makes it possible to change arbitrarily the value of the current Iwled through WLED1-WLEDn, and thus, the brightness of WLED1-WLEDn can be adjusted.

In the switching regulator shown in FIG. 7, as shown in FIG. 8, when starting the output voltage Vout, the feedback voltage Vfb is equal to ground until the output voltage Vout becomes greater than the voltage of the forward direction voltage of the white LED multiplied by n, where n is the number of LEDs, WLED1-WLEDn, connected in series. As a result, the error difference voltage Verr takes a high level value, which prevents feedback control of the switching regulator from working, and the duty cycle gets close to the maximum duty cycle. At this moment, for example, an input current Iin reaches the current limit value Isw set by the current limiting circuit 7, which means that an inrush current is generated. This is a problem in that a device at the preceding stage of the switching regulator gets influenced by the inrush current.

FIG. 9 is a block diagram illustrating a configuration of a switching regulator taken as a second example of conventional art. FIG. 10 is a timing chart explaining behavior of the switching regulator shown in FIG. 9.

To solve the problem of inrush current with the switching regulator shown in FIG. 7, the switching regulator shown in FIG. 9 further provides a soft-start circuit 8 to generate a soft-start voltage Vss, which is a reference voltage used for the soft start. Also, instead of the switching control circuit 4 in FIG. 7, the switching regulator shown in FIG. 9 provides a switching control circuit 9 operating in response to the soft-start voltage Vss received as input. As shown in FIG. 10, the soft-start voltage Vss increases gradually when the enable signal EN takes a high level value. The switching control circuit 9 shown in FIG. 9 compares the slope voltage Vslp and the lower one of the error difference voltage Verr and the soft-start voltage Vss, and generates the switching signal PWMOUT having the duty cycle according to the comparison result.

As a conventional switching regulator using soft-start voltage, for example, the patent document 1 discloses an invention. Also, as an improved usage of soft-start voltage, a switching regulator having a clamp circuit to set an upper limit of error difference voltage is disclosed, for example, in the patent document 3.

With conventional switching regulators explained above, by increasing the duty cycle of the switching transistor MN1 gradually after the enable signal EN takes a high level value, it is possible to control the input current Iin and the current Iwled through the WLED1-WLEDn while starting the output voltage Vout. However, since the duty cycle is determined with the comparison between the slope voltage Vslp and the lower one of the error difference voltage Verr and the soft-start voltage Vss, in a transition state in which the error difference voltage Verr starts to take a lower value than the soft-start voltage Vss, the input current Iin becomes greater than a steady state current, which means that an inrush current is generated. Also, at the moment when the error difference voltage Verr starts to decrease, the output voltage Vout has completely started, the feedback voltage Vfb has become equal to the reference voltage Vref, and the input current Iin is close to the steady state current. Therefore, if an inrush current is generated at this moment, a problem arises in that an overshoot from the steady state becomes too large.

PATENT LITERATURE

1. Japanese Laid-open Patent Publication. No. 07-336999

2. Japanese Laid-open Patent Publication No. 2006-141184

3. Japanese Laid-open Patent Publication No. 2007-185065

4. Japanese Laid-open Patent Publication No. 2007-185066

5. Japanese Laid-open Patent Publication No. 2010-011529

SUMMARY OF THE INVENTION

It is a general object of at least one embodiment of the present invention to provide a switching regulator that substantially obviates one or more problems caused by the limitations and disadvantages of the related art. Specifically, at least one embodiment of the present invention provides a switching regulator that prevents an inrush current from being generated while starting an output voltage.

In one embodiment of the invention, a switching regulator includes a switching element to generate an output voltage of the switching regulator, a reference voltage source to generate a reference voltage, a soft-start circuit to set the reference voltage increasing gradually from a first value to a second value, an error amplifier circuit to generate an error difference voltage indicating an error difference between the reference voltage and a feedback voltage of the output voltage of the switching regulator, a switching circuit to generate a switching signal to control the switching element according to the error difference voltage, and a current limiting circuit to generate a limiting signal indicating a comparison result between a current flowing through the switching element and a current limit value being set to increase gradually from a third value to a fourth value, wherein the switching circuit controls a duty cycle of the switching signal so that the current flowing through the switching element does not exceed the current limit value in response to the limiting signal.

According to at least one embodiment of the present invention, a switching regulator which prevents an inrush current from being generated while starting an output voltage is provided.

BRIEF DESCRIPTION OF THE DRAWINGS

Other objects and further features of embodiments will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
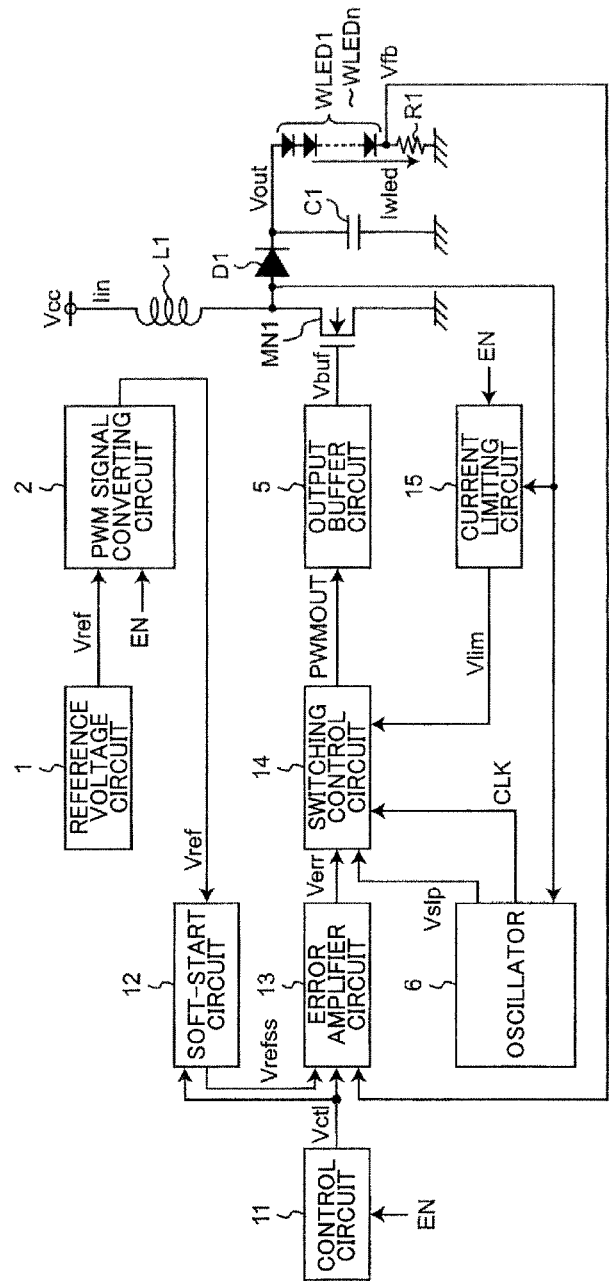
FIG. 1 is a block diagram illustrating a configuration of a switching regulator according to an embodiment of the invention.
Figure 2:
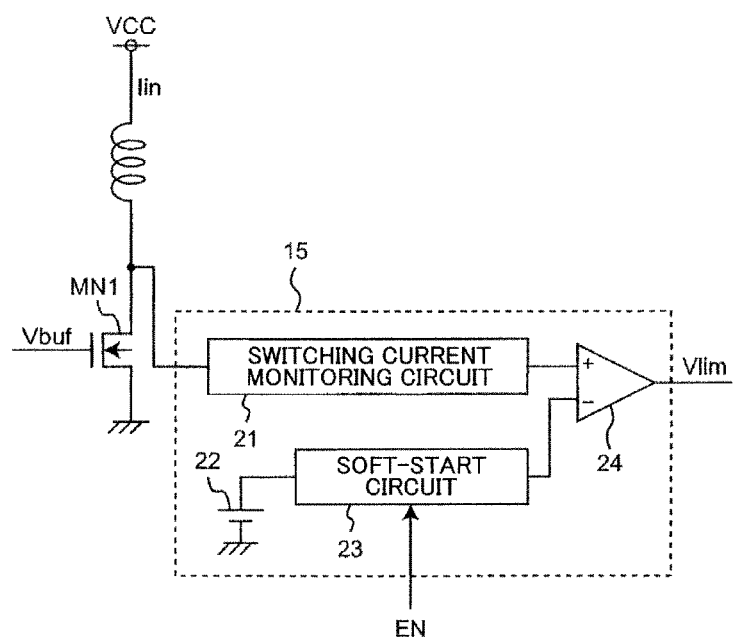
FIG. 2 is a block diagram illustrating a detailed configuration of a current limiting circuit 13 in FIG. 1.
Figure 3:
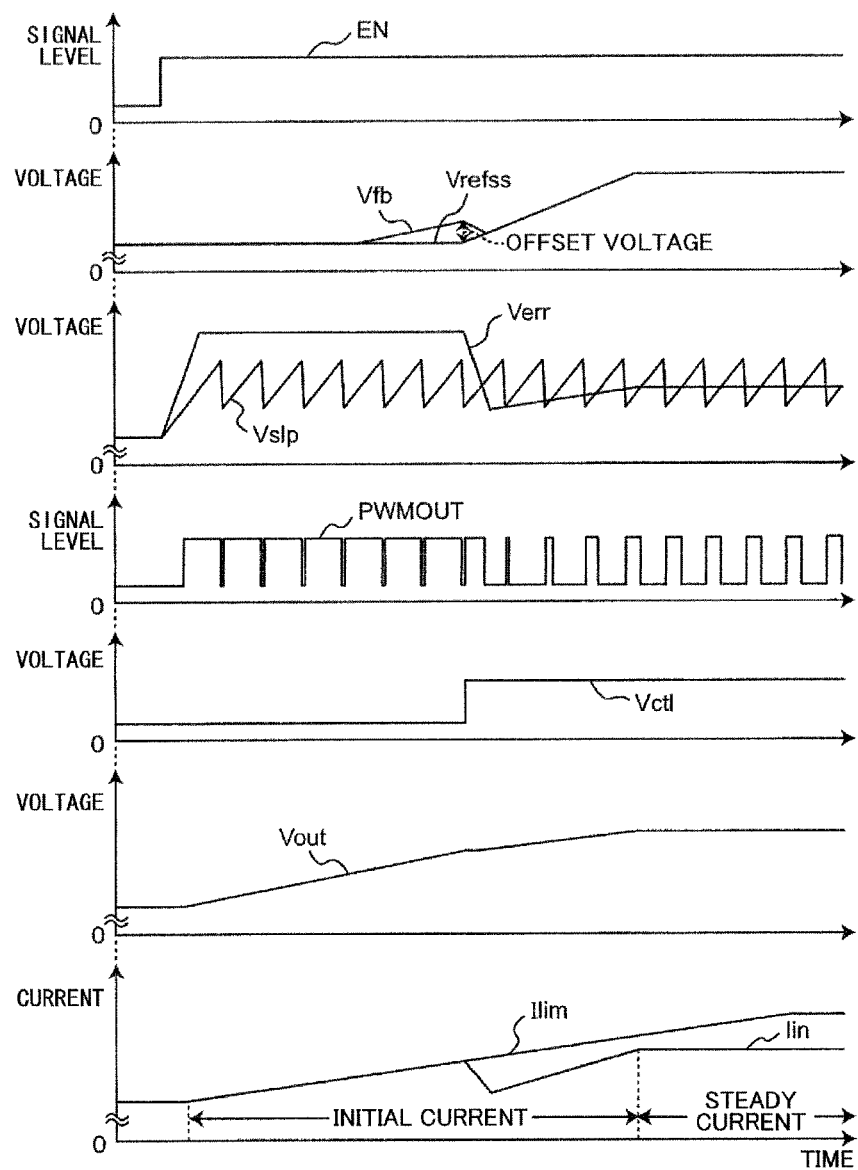
FIG. 3 is a timing chart explaining behavior of the switching regulator shown in FIG. 1.

FIG. 1 is a block diagram illustrating a configuration of a switching regulator according to an embodiment of the invention. The switching regulator shown in FIG. 1 is a step-up switching regulator adjusting brightness of white LEDs (WLEDs) in response to a PWM signal input as an enable signal EN. FIG. 2 is a block diagram illustrating a detailed configuration of a current limiting circuit 15 in FIG. 1. FIG. 3 is a timing chart explaining behavior of the switching regulator shown in FIG. 1.

Figure 7:
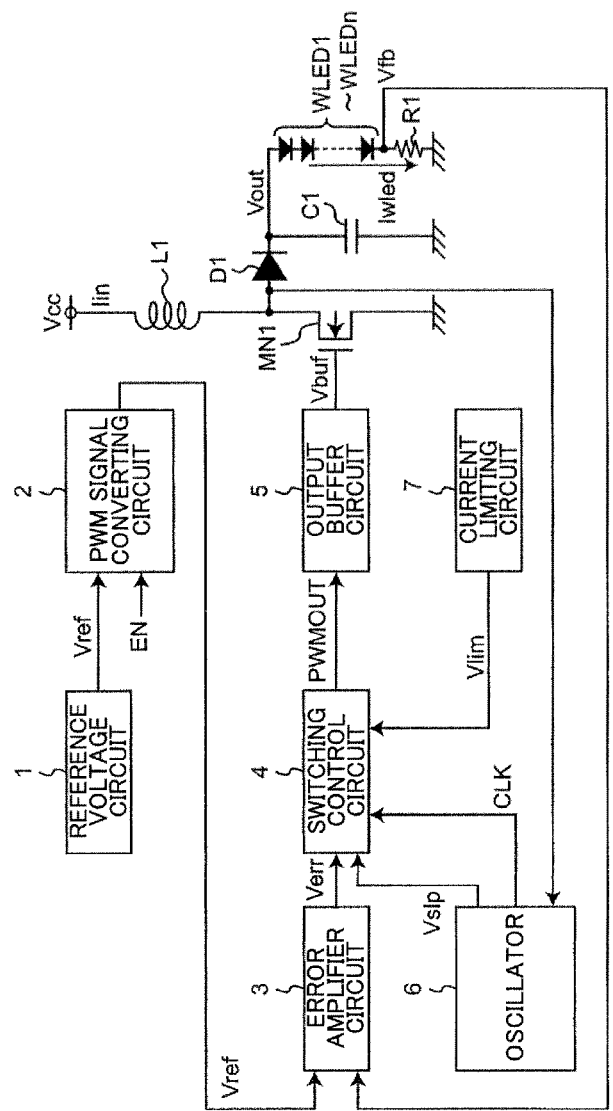
FIG. 7 is a block diagram illustrating a configuration of a switching regulator taken as a first example of conventional art.
Figure 8:
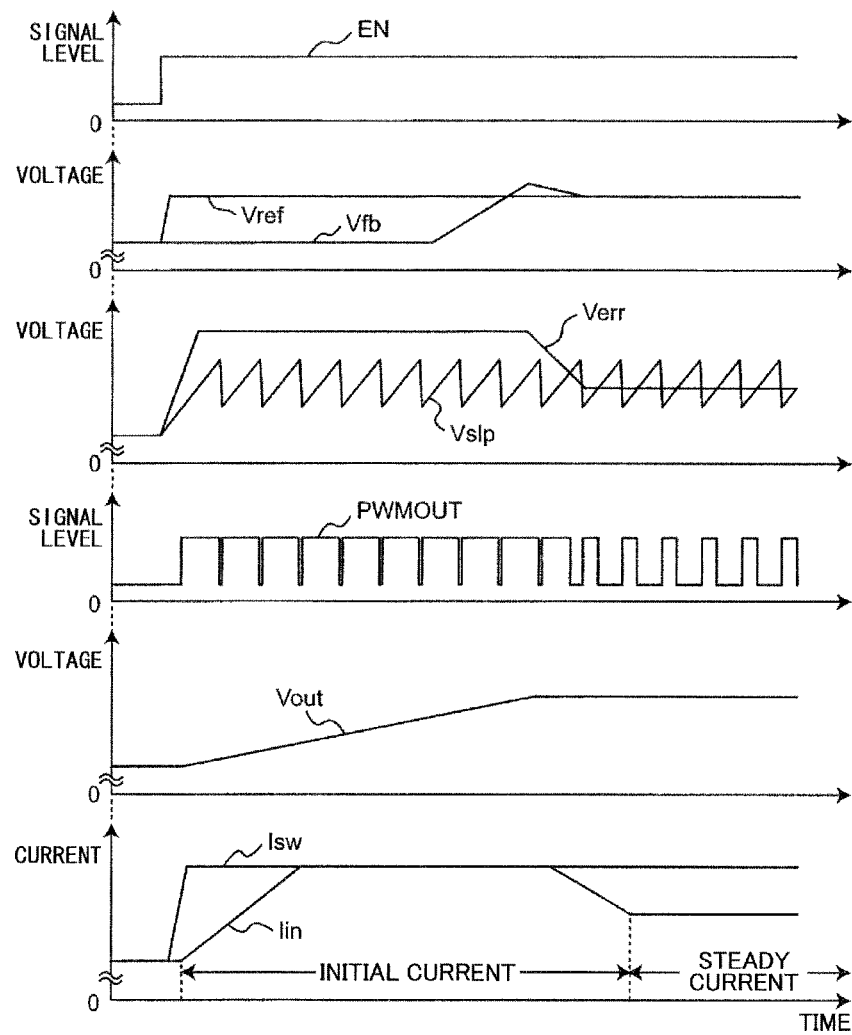
FIG. 8 is a timing chart explaining behavior of the switching regulator shown in FIG. 7.
Figure 9:
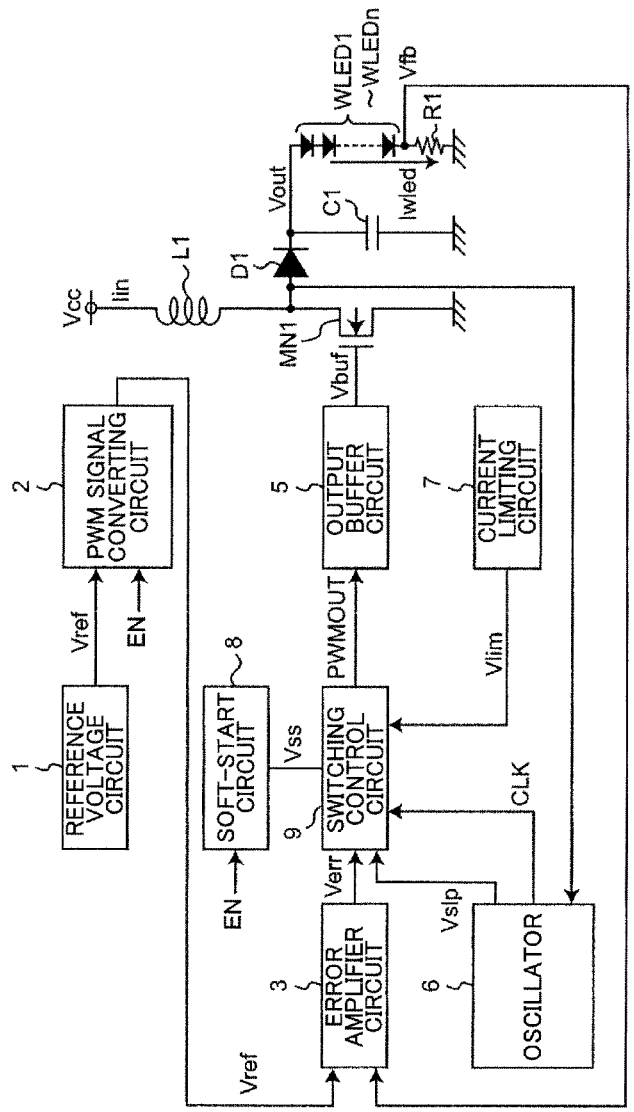
FIG. 9 is a block diagram illustrating a configuration of a switching regulator taken as a second example of conventional art.
Figure 10:
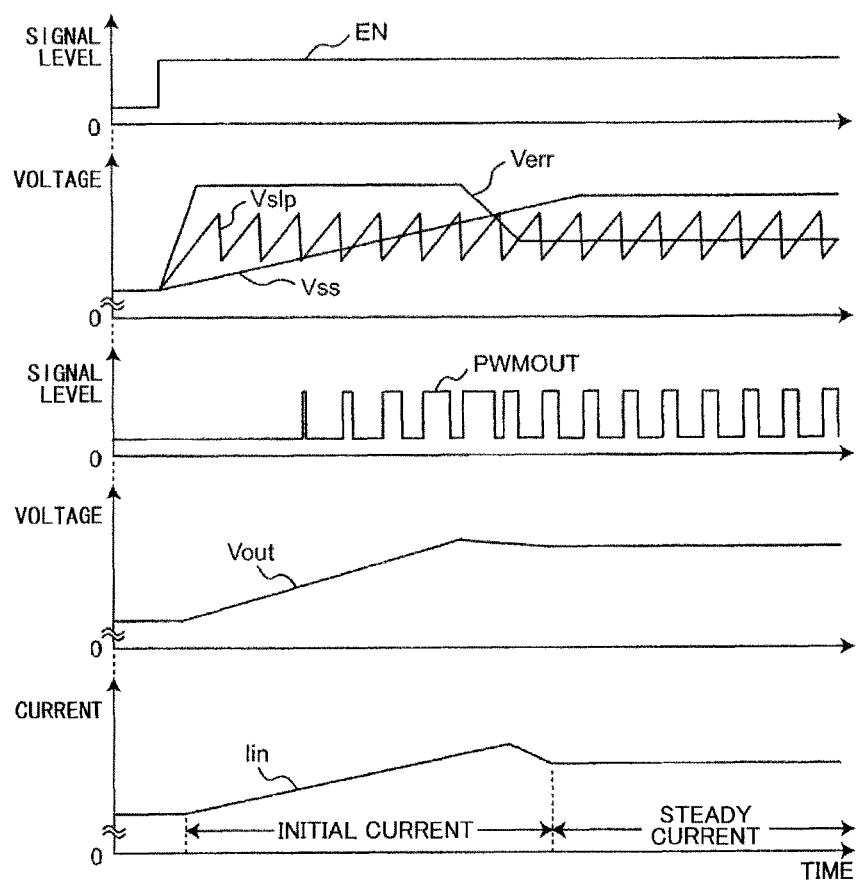
FIG. 10 is a timing chart explaining behavior of the switching regulator shown in FIG. 9.

The switching regulator shown in FIG. 1, as is the came as the switching regulator shown in FIG. 7, generates an output voltage Vout from the power supply voltage Vcc, which is applied to n white LEDs (WLED1-WLEDn), which are all the same type and connected in series. An inductor L1 and a switching transistor MN1 are connected in series between the power supply voltage Vcc and ground potential GND, to which an input current Iin is supplied from the power supply voltage Vcc. A node between the inductor L1 and the switching transistor MN1 is connected to a capacitor C1 and the WLED1-WLEDn via a rectifier D1. The WLED1-WLEDn are connected to ground via resistor R1.

A reference voltage circuit 1 generates a reference voltage Vref, which is sent to a PWM signal converting circuit 2. The PWM signal converting circuit 2 receives as input the PWM signal as the enable signal EN, changes Inc reference voltage Vref in response to a duty cycle of the enable signal EN (the PWM signal), which is sent to a soft-start circuit 12. The soft-start circuit 12 generates reference voltage Vrefss for soft start by gradually increasing the reference voltage Vref from a predetermined first value to a predetermined second value under control of a control signal Vctl from a control circuit 11. The reference voltage Vrefss for soft start is input to a non-inverted input terminal of an or amplifier circuit 13. An inverted input terminal of the error amplifier circuit 13 receives a feedback voltage Vfb as input, which is generated between WLED1-WLEDn and the resistor R1. The error amplifier circuit 13, under control of the control signal Vctl from the control circuit 11, generates an error difference voltage Verr indicating an error difference between the reference voltage Vrefss for soft start and the feedback voltage Vfb, which is sent to a switching control circuit 14.

The control circuit 11 selectively switches between two states: a first state in which the soft-start circuit 12 sets the reference voltage Vrefss to the first value, and the error amplifier circuit 13 is set with a predetermined offset voltage; and a second state in which the reference voltage Vrefss is set to increase gradually from the first value to the second value by the soft-start circuit 12 to release the offset voltage in the error amplifier circuit 13.

In addition to the error difference voltage Verr, the switching control circuit 14 further receives as inputs a slope voltage Vslp and a clock signal CLK generated by an oscillator 6, and a limiting signal Vlim corresponding to a predetermined current limit value Ilim generated by a current limiting circuit 15.

As shown in FIG. 2, the current limiting circuit 15 provides a switching current monitoring circuit 21, a reference voltage source 22, a soft-start circuit 23, and a comparator 24. The switching current monitoring circuit 21 measures the input current Iin flowing into the switching transistor MN1 to generate a voltage corresponding to the input current Iin. The soft-start circuit 23, when the enable signal EN takes a high level value, generates the reference voltage for soft-start by gradually increasing the reference voltage at the reference voltage source 22 from a predetermined third value to a predetermined fourth value. The reference voltage for soft-start corresponds to the current limit value Ilim, which is increased, for example, from 0 A to a predetermined current value. The comparator 24 compares the output voltage from the switching current monitoring circuit 21 and the output voltage from the soft-start circuit 23 to generate the Limiting signal Vlim.

The switching control circuit 14 generates switching signal PWMOUT based on the error difference voltage Verr, the slope voltage Vslp, the clock signal CLK, and the limiting signal Vlim. Specifically, the switching control circuit 14 compares the error difference voltage Verr and the slope voltage Vslp to generate the switching signal PWMOUT, which controls the duty cycle of the switching transistor MN1 to make the feedback voltage Vfb become equal to the reference voltage Vref (PWM control.). To limit the input current Iin flowing into the switching transistor MN1 below the current limit value Ilim for soft start, namely, to prevent excessive current from flowing into the switching transistor MN1, the switching control circuit 14 controls the duty cycle of the switching signal PWMOUT by prioritizing the limiting signal Vlim over the error difference voltage Verr when generating the switching signal PWMOUT. The switching control circuit 14 applies the switching signal PWMOUT to the gate of the switching transistor MN1 via an output buffer circuit 5.

When the soft-start circuit 12 and the error amplifier circuit 13 are in the first state, the error amplifier circuit 13 outputs the error difference voltage Verr corresponding to the maximum duty cycle of the switching transistor MN1. At this moment, if the input current fin flowing into the switching transistor MN1 reaches to the current limit value Ilim for soft start, the switching control circuit 14 controls the duty cycle to limit the current Iin according to the limiting signal Vlim. If the input current Iin flowing into the switching transistor MN1 does not reach to the current limit value Ilim, the switching control circuit 14 controls the switching transistor MN1 with the maximum duty cycle in response to the error difference signal Verr. Thus, in the first state, inrush current exceeding the current limit value Ilim for soft start can be avoided. Alternatively, when the soft-start circuit 12 and the error amplifier circuit 13 are in the second state, the feedback voltage Vfb increases as the reference voltage Vrefss for soft start increases, which gradually increases the current Iwled flowing through the WLED1-WLEDn, and prevents the inrush current without overshooting a steady state current to transition into a steady state.

In the switching regulator shown in FIG. 1, the control circuit 11 sets the soft-start circuit 12 and the error amplifier circuit 13 in the first state when the enable signal EN takes a high level value while starting the output voltage Vout, which limits the input current Iin flowing into the switching transistor MN1 below the current limit value Ilim for soft start, and prevents excessive current from flowing into the switching transistor MN1. Then, the control circuit 11 sets the soft-start circuit 12 and the error amplifier circuit 13 in the second state, which causes the feedback voltage Vfb, the error difference voltage Verr, and the duty cycle to increase, and the current through the WLED1-WLEDn Iwled to increase gradually. While starting the output voltage Vout, by setting the soft-start circuit 12 and the error amplifier circuit 13 in the first state initially, the input current Iin flowing into the switching transistor MN1 is limited below the current limit value Ilim for soft start, the feedback voltage Vfb is increased to the offset voltage of the error amplifier circuit 13, which lowers the error difference voltage Verr to the slope voltage Vslp with a smaller value of the feedback voltage Vfb than a value of a feedback voltage used in the conventional switching regulators. Thus, in the first state, inrush current is prevented, and while keeping the current of Iin smaller than a steady state current, it is possible to switch to the second state. Moreover, in the second state, it is possible to transition into the steady state without overshooting the steady state current.

Figure 4:
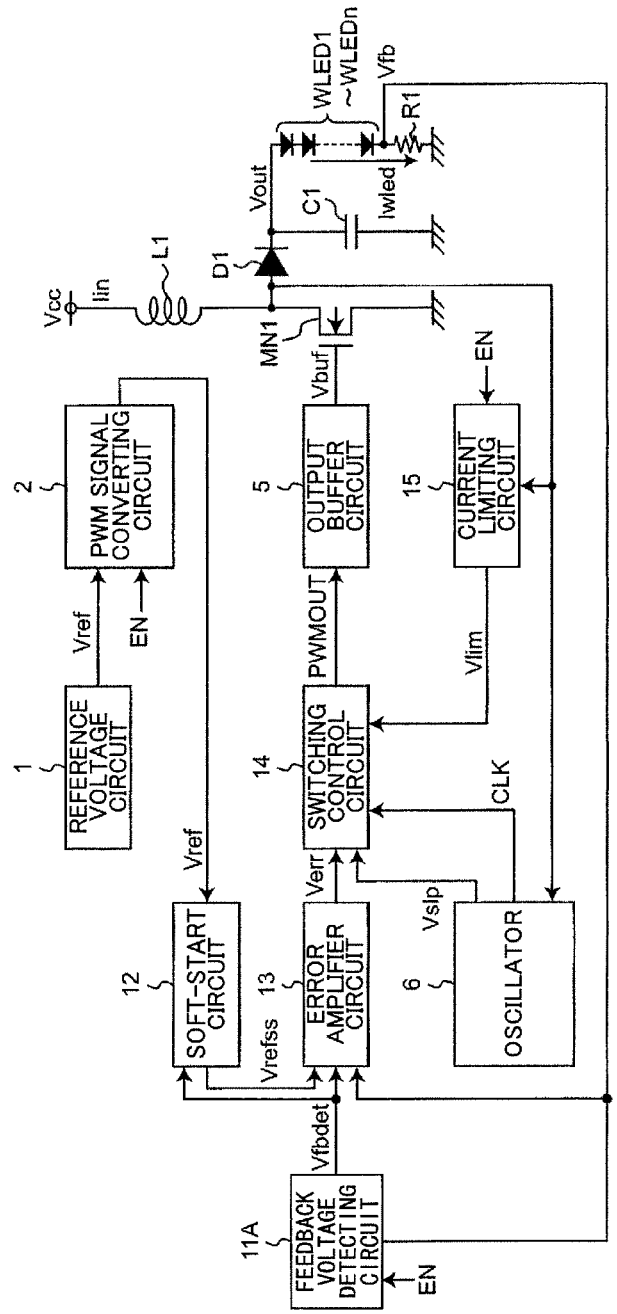
FIG. 4 is a block diagram illustrating a configuration of a first modified example of a switching regulator according to an embodiment of the invention.

FIG. 4 is a block diagram illustrating a configuration of a first modified example of a switching regulator according to an embodiment of the invention. The switching regulator in FIG. 4 shows a modified example of the control circuit 11 shown in FIG. 1, which provides a feedback voltage detecting circuit 11A to generate a control signal Vfbdet to control the soft-start circuit 12 and the error amplifier circuit 13 in response to the feedback voltage Vfb. The feedback voltage detecting circuit 11A, when the switching regulator receives the enable signal EN as input, sets the soft-start circuit 12 and the error amplifier circuit 13 in the first state, and, when the feedback voltage Vfb becomes greater than predetermined threshold voltage, sets the soft-start circuit 12 and the error amplifier circuit 13 in the second state.

Figure 5:
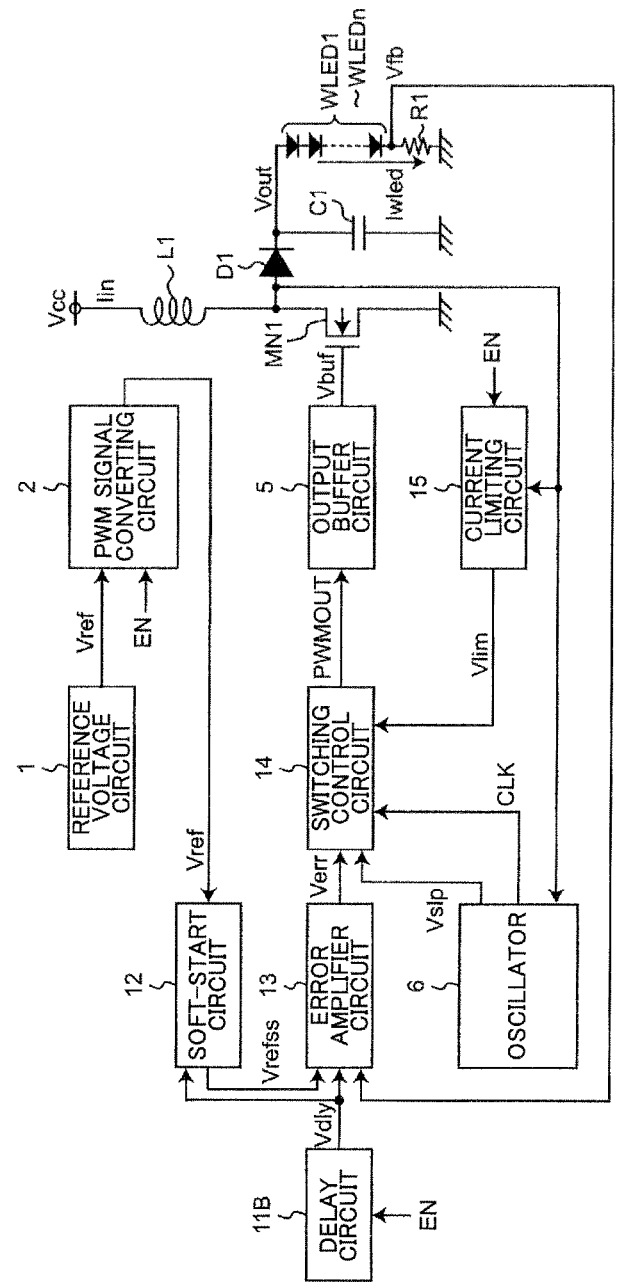
FIG. 5 is a block diagram illustrating a configuration of a second modified example of a switching regulator according to an embodiment of the invention.

FIG. 5 is a block diagram illustrating a configuration of a second modified example of a switching regulator according to an embodiment of the invention. The switching regulator in FIG. 5 shows a modified example of the control circuit 11 shown in FIG. 1, which provides a delay circuit 11B to generate a control signal Vdly to control the soft-start circuit 12 and the error amplifier circuit 13. The delay circuit 11B, when the switching regulator receives the enable signal EN as input, sets the soft-start circuit 12 and the error amplifier circuit 13 in the first state, and, when a predetermined time has passed after receiving the enable signal EN, sets the soft-start circuit 12 and the error amplifier circuit 13 in the second state.

Figure 6:
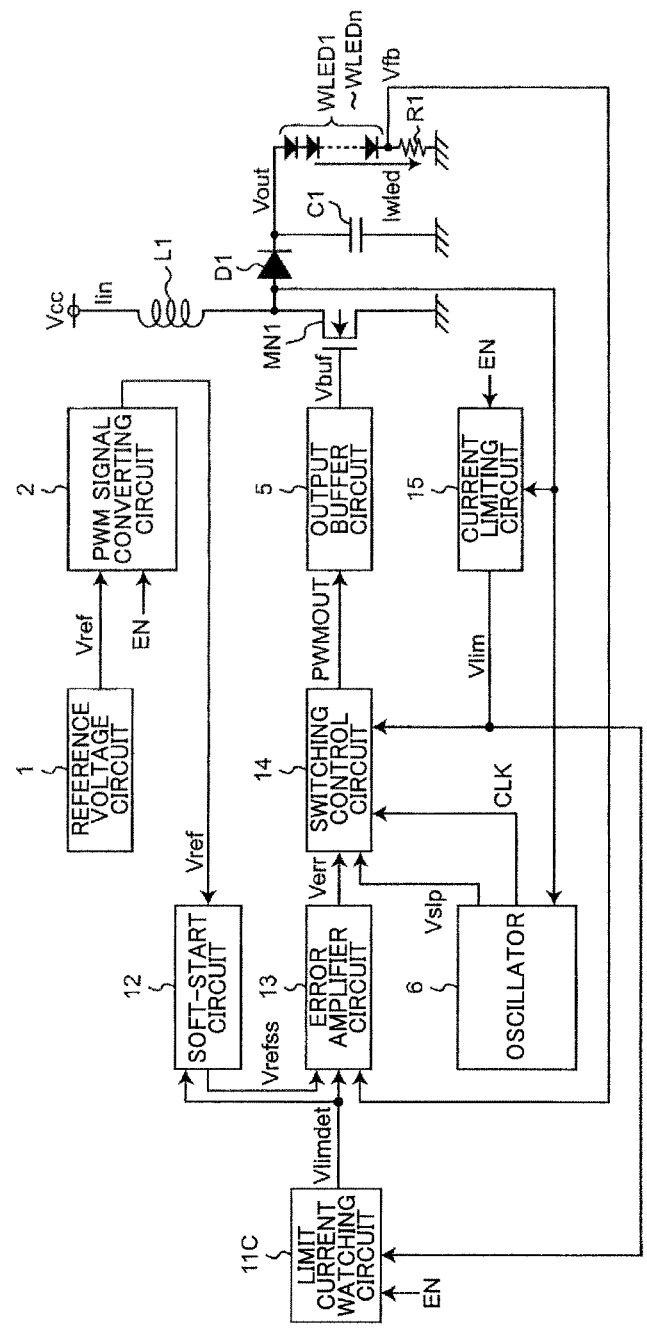
FIG. 6 is a block diagram illustrating a configuration of a third modified example of a switching regulator according to an embodiment of the invention.

FIG. 6 is a block diagram illustrating a configuration of a third modified example of switching regulator according to an embodiment of the invention. The switching regulator in FIG. 6 shows a modified example of the control circuit 11 shown in FIG. 1, which provides a limit current watching circuit 11C to generate a control signal Vlimdet to control the soft-start circuit 12 and the error amplifier circuit 13 according to the limiting signal Vlim. The limit current watching circuit 11C, when the switching regulator receives the enable signal EN as input, sets the soft-start circuit 12 and the error amplifier circuit 13 in the first state, and, when the input current Iin becomes greater than the current limit value Ilim, sets the soft-start circuit 12 and the error amplifier suit 13 in the second state.

With a switching regulator disclosed in at least one embodiment of the present invention, a switching control circuit can or event inrush current from being generated while starting an output voltage, by controlling a duty cycle of a switching signal according to a limiting signal, and limiting a current flowing through a switching element below a current limit value.

With the switching regulator, when a soft-start circuit and an error amplifier circuit are in the first state, an error amplifier circuit can output an error difference voltage corresponding to the maximum duty cycle of the switching element. At this moment, if the current flowing through the switching element reaches the current limit value, the switching control circuit can control the duty cycle to limit the current, and if the current flowing through the switching element does not reach the current limit value, the switching control circuit can control the switching element with the maximum duty cycle in response to a difference signal. Therefore, it is possible to prevent the switching control circuit from switching off the switching element due to an offset voltage, which is caused by variations during manufacturing of error amplifier circuits. Therefore, it is always possible to control the switching element at the maximum duty cycle. Also, a control circuit selectively switches between the first state in which the duty cycle of the switching element is controlled with the current limit value only, and the second state in which the duty cycle is controlled with a feedback voltage and a reference voltage. By setting into the first state while starting the output voltage, the control circuit starts the feedback voltage. Then, by setting into the second state, the control circuit can prevent an inrush current without overshooting a steady state current to transition into a steady state.

With the switching regulator, having a PWM signal converting circuit to control the reference voltage input to the soft-start circuit in response to a PWM signal, it is possible to adjust the current through the WLED1-WLEDn, and brightness of the WLED1-WLEDn.

The disclosures herein are applicable to, for example, a switching regulator to drive white LEDs used for backlights.

Further, the present invention is not limited to these embodiments, but various variations and modifications may be made without departing from the scope of the present invention.

The present application is based on Japanese Priority Application No. 2012-061308 filed on Mar. 19, 2012, with the Japanese Patent Office, the entire contents of which are hereby incorporated by reference.

What is claimed is:

1. A switching regulator comprising:
   a switching element to generate an output voltage of the switching regulator;
   a reference voltage source to generate a reference voltage;
   a soft-start circuit to set the reference voltage increasing gradually from a first value to a second value;
   an error amplifier to generate an error difference voltage indicating an error difference between the reference voltage and a feedback voltage of the output voltage of the switching regulator;
   a current limiting circuit to generate a limiting signal indicating a comparison result between a current flowing through the switching element and a current limit value having been set to increase gradually from a third value to a fourth value; and
   a switching control circuit to generate a switching signal to control the switching element to regulate a duty cycle of the switching element, based on the error difference voltage and the limiting signal,
   wherein the switching control circuit controls the duty cycle of the switching signal in response to the limiting signal so that the current flowing through the switching element does not exceed the current limit value; and
   a control circuit to control the soft-start circuit and the error amplifier circuit,
   wherein the control circuit selectively switches between a first state in which the soft-start circuit sets the reference voltage to the first value and the error amplifier circuit is set with a predetermined offset voltage, and a second state in which the reference voltage is set to increase gradually from the first value to the second value by the soft-start circuit to release the offset voltage in the error amplifier circuit, and
   wherein the control circuit, when the switching regulator receives an enable signal as input, sets the soft-start circuit and the error amplifier circuit in the first state, and, when the feedback voltage becomes greater than a predetermined threshold voltage, sets the soft-start circuit and the error amplifier in the second state.

2. The switching regulator as claimed in claim 1, further comprising:
   a PWM signal converting circuit to control the reference voltage input to the soft-start circuit in response to a predetermined PWM signal.

3. The switching regulator as claimed in claim 1, wherein the switching control circuit controls the duty cycle of the switching signal by prioritizing the limiting signal over the error difference voltage so that the current flowing through the switching element does not exceed the current limit value.

4. A switching regulator comprising:
   a switching element to generate an output voltage of the switching regulator;
   a reference voltage source to generate a reference voltage;
   a soft-start circuit to set the reference voltage increasing gradually from a first value to a second value;
   an error amplifier to generate an error difference voltage indicating an error difference between the reference voltage and a feedback voltage of the output voltage of the switching regulator;
   a current limiting circuit to generate a limiting signal indicating a comparison result between a current flowing through the switching element and a current limit value having been set to increase gradually from a third value to a fourth value; and
   a switching control circuit to generate a switching signal to control the switching element to regulate a duty cycle of the switching element, based on the error difference voltage and the limiting signal,
   wherein the switching control circuit controls the duty cycle of the switching signal in response to the limiting signal so that the current flowing through the switching element does not exceed the current limit value; and
   a control circuit to control the soft-start circuit and the error amplifier circuit,
   wherein the control circuit selectively switches between a first state in which the soft-start circuit sets the reference voltage to the first value and the error amplifier circuit is set with a predetermined offset voltage, and a second state in which the reference voltage is set to increase gradually from the first value to the second value by the soft-start circuit to release the offset voltage in the error amplifier circuit, and
   wherein the control circuit, when the switching regulator receives an enable signal as input, sets the soft-start circuit and the error amplifier circuit in the first state, and, when a predetermined time has passed after receiving the enable signal, sets the soft-start circuit and the error amplifier in the second state.

5. The switching regulator as claimed in claim 4, further comprising:
   a PWM signal converting circuit to control the reference voltage input to the soft-start circuit in response to a predetermined PWM signal.

6. A switching regulator comprising:
   a switching element to generate an output voltage of the switching regulator;
   a reference voltage source to generate a reference voltage;
   a soft-start circuit to set the reference voltage increasing gradually from a first value to a second value;

an error amplifier to generate an error difference voltage indicating an error difference between the reference voltage and a feedback voltage of the output voltage of the switching regulator;

a current limiting circuit to generate a limiting signal indicating a comparison result between a current flowing through the switching element and a current limit value having been set to increase gradually from a third value to a fourth value; and a switching control circuit to generate a switching signal to control the switching element to regulate a duty cycle of the switching element, based on the error difference voltage and the limiting signal, wherein the switching control circuit controls the duty cycle of the switching signal in response to the limiting signal so that the current flowing through the switching element does not exceed the current limit value; and a control circuit to control the soft-start circuit and the error amplifier circuit, wherein the control circuit selectively switches between a first state in which the soft-start circuit sets the reference voltage to the first value and the error amplifier circuit is set with a predetermined offset voltage, and a second state in which the reference voltage is set to increase gradually from the first value to the second value by the soft-start circuit to release the offset voltage in the error amplifier circuit, and wherein the control circuit, when the switching regulator receives an enable signal as input, sets the soft-start circuit and the error amplifier circuit in the first state, and, when the current flowing through the switching element becomes greater than the current limit value, sets the soft-start circuit and the error amplifier in the second state.

7. The switching regulator as claimed in claim 6, further comprising:

a PWM signal converting circuit to control the reference voltage input to the soft-start circuit in response to a predetermined PWM signal.

\* \* \* \* \*